Nov. 19, 1946.  J. H. PRATT  2,411,229
SEALING MEANS FOR PISTON SUBJECT TO FLUID PRESSURE
Filed June 5, 1945  2 Sheets-Sheet 1
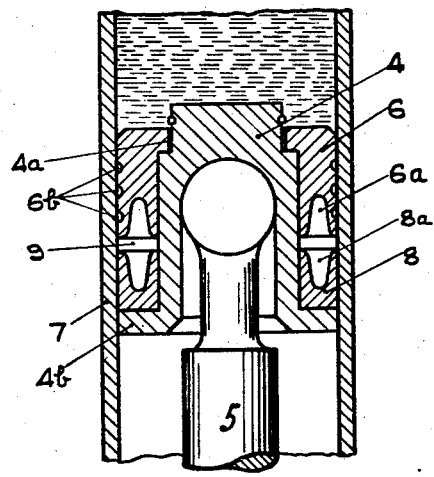
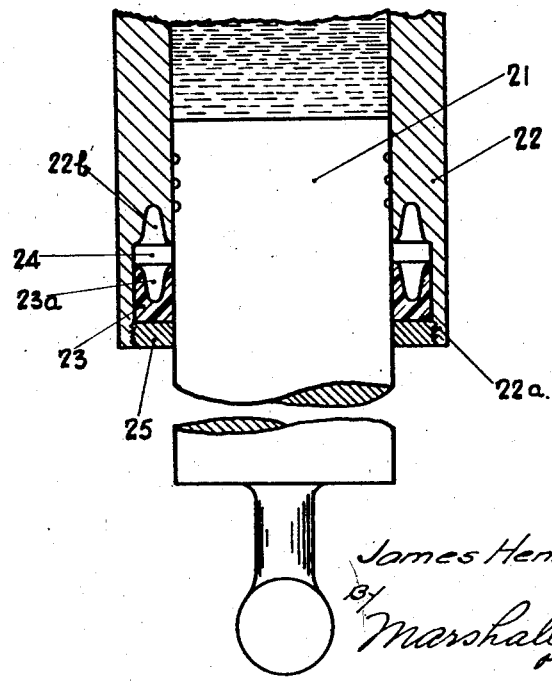

Nov. 19, 1946.        J. H. PRATT          2,411,229
        SEALING MEANS FOR PISTON SUBJECT TO FLUID PRESSURE
            Filed June 5, 1945          2 Sheets-Sheet 2

James Henry Pratt
    Inventor
By Marshall & Marshall
    Attorneys

Patented Nov. 19, 1946

2,411,229

UNITED STATES PATENT OFFICE 2,411,229

SEALING MEANS FOR PISTONS SUBJECT TO FLUID PRESSURE

James Henry Pratt, Birmingham, England

Application June 5, 1945, Serial No. 597,676
In Great Britain June 22, 1944

6 Claims. (Cl. 309—4)

This invention has reference to improvements in sealing means for pistons subject to fluid pressure and has for its object to provide a sealing means which for all practical purposes is leak-proof, which entails less wear on the resilient element of the sealing means and which is readily adaptable to fluid pressure piston and cylinder mechanisms without involving any material changes in the normal construction of such mechanisms.

Accordingly the invention consists of an improved sealing means for pistons subject to fluid pressure in which a resilient sealing means located to the rear of the acting face of a piston is associated with a space within which is trapped and compressed air which may be further compressed by fluid passing between the piston and the wall of a substantially vertically arranged cylinder and which on compression reacts on the resilient sealing means to effect a leak proof seal with a pressure which is less than that built up on the acting face of the piston with a consequential reduction in the wear of the sealing surface of the said resilient sealing means.

The invention will now be described with particular reference to the accompanying drawings wherein—

Figure 1 is a fragmentary sectional view of the invention as embodied in a master cylinder unit such as is employed in conjunction with hydraulically actuated mechanisms.

Figure 2 is a sectional view of the invention as embodied in a pneumatic suspension means for vehicles and Figure 3 is a fragmentary view illustrating a modification of the invention as illustrated in Figures 1 and 2.

Figure 2:
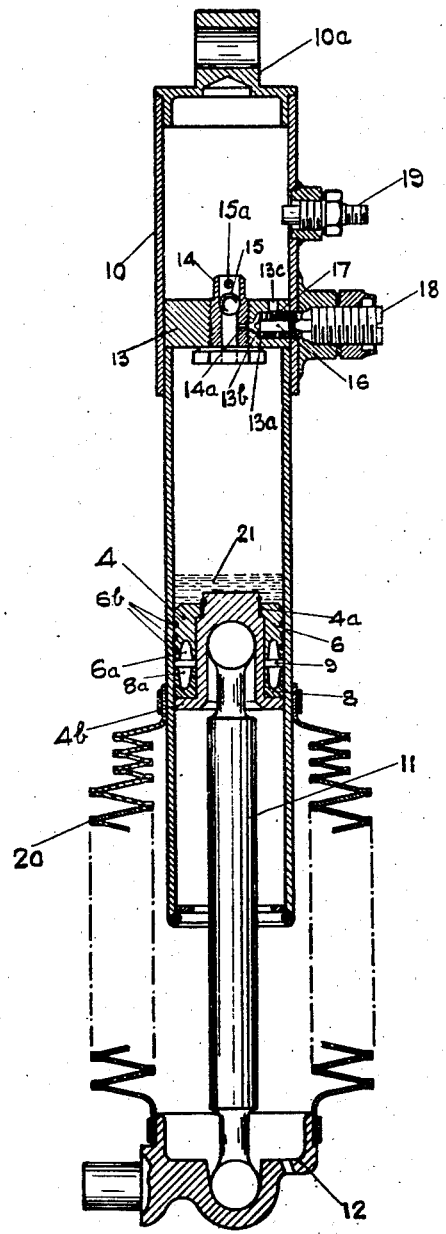

Describing first the embodiment of the invention as illustrated in Figure 1 a plunger 4 to which the operational effort is applied by way of the rod 5 has mounted on a shouldered portion 4a thereof a piston 6 which is a close working fit in the bore of the vertically arranged master cylinder 7, said shouldered portion 4a being of lesser diameter than the bore of the cylinder 7. This piston 6 is formed in the end thereof opposite to the acting face with an annular re-entrant groove 6a which is disposed oppositely to the re-entrant gap 8a in a resilient sealing cup 8 of the normal U-shape in cross section, said sealing cup 8 abutting a flange 4b formed at the rear end of the plunger 4 with the plane containing the forward rim of the sealing cup 8 spaced from the rear end of the piston 6 so that an annular chamber 9 is formed between the rear end of the piston 6 and the front end of the sealing cup 8. The periphery of the piston 6 is furnished with a plurality of grooves 6b and if preferred provision may be made for the fitment of compressible piston rings.

In use any liquid passing between the piston 6 and the wall of the cylinder 7 leaks into the annular space 9 between the rear end of the piston 6 and the forward end of the sealing cup 8 and the displaced air is caused to accumulate in the annular re-entrant groove 6a in the rear end of the piston 6 so that when the liquid in the annular space 9 comes under pressure on an acting stroke of the piston 6 the air trapped in the annular re-entrant groove 6a is compressed and caused to react through the liquid column in the annular space 9 on the lips of the sealing cup 8 thus effecting an effective leak proof seal without entailing the pressure and the consequent degree of wear of the sealing cup 8 which obtains in the more usual system in which the lips of the sealing cup are forced into sealing contact by a relatively incompressible liquid column and since the pressure of the liquid in the annular space 9 will not attain to that built up on the acting face of the piston 6 on a pressure stroke as liquid cannot leak past the piston 6 at a rate commensurate with the relatively rapid displacement of the piston 6 which takes place on the initiation of an acting stroke.

Describing now the invention as applied to a pneumatic suspension means for vehicles as illustrated in Figure 2 using where desirable the reference numerals employed in conjunction with the description of Figure 1 to denote analogous parts:

The frame of a vehicle (not shown) is pivotally connected to a lug 10a carried at the upper end of a vertically arranged cylinder 10 within which is disposed a plunger 4 the under portion of which has a ball and socket association with the upper end of a piston rod 11 the lower end of which in turn has a ball and socket association with a bracket 12 carried by an axle of a vehicle.

The bore of the cylinder 10 is of two diameters with the bore of the upper portion of the greater diameter. At the junction of the bores there is disposed a solid partition wall 13 having in the centre thereof a vertically drilled hole within which is screwed a vertical tubular housing 14 which is provided with a seating for a one way ball valve 15, said ball valve 15 having an opening movement towards the closed end of the cylinder 10 the degree of which however is restrained by a transverse peg 15a.

The partition 13 is provided with a lateral bore 13a within which is disposed a needle valve 16 which tends to remain continually off its seating 13b under the influence of a compression spring 17 the degree of compression of which may be adjusted by means of a screw plug 18 accessible from the outside of the cylinder 10.

The seating 13b for this needle valve 16 is formed adjacent to the end of a passage 14a in the tubular housing 14 below the seating for the ball valve 15 and the partition 13 is formed with a hole 13c which places the upper part of the cylinder 10 in communication with the lateral bore 13a within which the needle valve is contained.

Thus there is always a permanently open leak passage between the upper and lower portions of the cylinder 10.

Secured to the side of the upper portion of the cylinder 10 is an inflation valve 19 by way of which air may be compressed initially in the upper portion of the cylinder and subsequently replenished.

The piston plunger 4 (as is illustrated also in Figure 1) is of a stepped formation with a shouldered portion 4a of lesser diameter than the lower bore of the cylinder at the acting end and an annular flange 4b of substantially the same diameter as the said bore at the opposite end.

Mounted on the shouldered portion 4a is a piston 6 which is a close working fit in the lower portion of the cylinder 10 and which is formed in the end thereof opposite to the acting face with an annular re-entrant groove 6a. This re-entrant groove 6a is disposed oppositely to the re-entrant gap 8a in a resilient annular sealing cup 8 of the normal U-shape in cross section, said sealing cup 8 which conveniently is made of synthetic rubber or of a rubber like plastic being disposed around the intermediate portion of the plunger 4 and in abutment with the annular flange 4b at the lower end thereof. The annular sealing cup 8 is of a depth such that the plane containing the forward rim of the sealing cup 8 is spaced from the rear end of the piston head so that an annular chamber 9 is formed between the rear end of the piston 6 and the adjacent end of the sealing cup 8.

The periphery of the piston 6 is formed with a plurality of shallow grooves 6b in which lubricant may collect.

The lower portion of the cylinder 10 and the projecting portion of the piston rod 11 and its lower ball and socket mounting are enclosed by a bellows 20 one end of which is secured to the periphery of the power portion of the wall of the cylinder 10, whereas the other end is secured to the bracket 12.

A supply of lubricating oil is charged into the cylinder 10 and this tends to collect in a shallow column 21 on top of the piston 6.

In operation, when the piston 6 moves upwardly the ball valve 15 is lifted off its seat and further compression of air takes place in the upper portion of the cylinder 10, and upon a downward movement the pressure thus generated is dissipated at a controlled rate of way of the hole 13c, bore 13a and the needle valve controlled leak passage 14a.

Any tendency to leakage around the piston 6 causes lubricating oil to pass into the annular space 9 between the rear end of the piston 6 and the adjacent end of the sealing cup 8 and the displaced air is caused to accumulate in the annular re-entrant groove 6a in the rear end of the piston 6 so that when the oil in the annular space 9 comes under pressure on an acting stroke of the piston 6 the air trapped in the annular re-entrant groove 6a is compressed and caused to react through the accumulated oil on the lips of the annular sealing cup 8, thus effecting an effective leak proof seal without entailing the pressure and the consequent degree of wear of the sealing cup which obtains in the more usual system as has been referred to hereinbefore.

It will be appreciated that academically the same effect will be attained by the use of a compressed gas alone although in most applications it will generally be necessary to use a lubricant.

Further, it will be appreciated that if desired the adjustable needle valve 16 may be dispensed with and a simple leak passage employed.

In the modification illustrated in Figure 3 the plunger 21 is a working fit in the complementary master cylinder 22 and may move through a stationary resilient sealing cup 23 of U-shape in cross section which is located in an enlarged cylindrical section 22a adjacent to the outer end of the master cylinder 22 the re-entrant gap 23a in the sealing cup 23 being located opposite an annular re-entrant groove 22b formed in the presented end of the enlarged section 22a with an annular space 24 between the plane containing the forward rim of the sealing cup 23 and the presented end of the enlarged section 22a. The sealing cup 23 abuts the upper face of an annular screwed closure member 25 which closes the lower end of the enlarged section.

In this embodiment of the invention also liquid leaking between the plunger 21 and the wall of the cylinder 22 accumulates in the annular space 24 and traps the displaced air in the annular re-entrant groove 22b so that this air is compressed on an acting stroke and caused to react through the liquid column in the annular space 24 to force the lips of the sealing cup 23 into sealing contact with the plunger 21 and with the wall of the enlarged section 22a again without subjecting the sealing cup 23 to the pressure and consequent wear incidental to the normal practice in which the sealing cup 23 is expanded into sealing contact by a relatively non-compressible liquid column.

This embodiment of the invention can be adapted also to a pneumatic suspension system as described with reference to Figure 2.

I claim:

1. Sealing means for pistons comprising a substantially vertically arranged cylinder, a piston for reciprocation within said cylinder, a resilient sealing means having a space within its body and located to the rear of the acting face of the piston and a space open to the cylinder and partially bounded by the said resilient means and in communication with the space within the body of said resilient means and into which any fluid leaking past the piston can accumulate and effect a compression of air within the space which is caused to react on the resilient sealing means to effect a leak proof seal by expanding the said resilient means tightly against the inner wall of said cylinder with a pressure which is less than that built up on the acting face of the piston.

2. Sealing means for pistons comprising a substantially vertically arranged cylinder, a piston for reciprocation within said cylinder, a resilient sealing means incorporating a re-entrant groove located to the rear of the acting face of the piston, a complementary re-entrant groove oppositely disposed to the re-entrant groove of the resilient sealing means and a space which is open both to the said re-entrant grooves and to the cylinder and into which any fluid leaking past the piston can accumulate and effect a compression of the air which becomes trapped in the re-entrant groove at the rear of the acting face of the piston and which entails a reaction in the re-entrant groove of the resilient sealing means which effects a leak proof seal with a pressure which is less than that built up on the acting face of the piston.

3. Sealing means for pistons comprising a substantially vertically arranged cylinder, a piston for reciprocation within said cylinder, a resilient sealing means having a re-entrant groove and which is movable with the piston and which is located to the rear of the acting face of the piston, a complementary re-entrant groove in the rear end of the piston which is oppositely disposed relatively to the re-entrant groove of the resilient sealing means and a space which is open both to the re-entrant grooves and to the cylinder and into which any fluid leaking past the piston can accumulate and effect a compression of the air which becomes trapped in the re-entrant groove at the rear of the acting face of the piston and which entails a reaction in the re-entrant groove of the resilient sealing means which effects a leak proof seal with a pressure which is less than that built up on the acting face of the piston.

4. Sealing means for pistons comprising a substantially vertically arranged cylinder, a piston for reciprocation within said cylinder, a stationary resilient means which is located to the rear of the acting face of the piston and which has a re-entrant groove, a complementary stationary re-entrant groove which is oppositely disposed relatively to the re-entrant groove of the resilient sealing means and a space which is open both to the re-entrant grooves and to the cylinder and into which any fluid leaking past the piston can accumulate and effect a compression of the air which becomes trapped in the re-entrant groove adjacent to the rear of the acting face of the piston and which entails a reaction in the re-entrant groove of the resilient sealing means which effects a leak proof seal with a pressure which is less than that built up on the acting face of the piston.

5. Sealing means for pistons comprising a substantially vertically arranged cylinder, a plunger for reciprocation within said cylinder and having at its rear end a flange which is a working fit within the cylinder, a piston mounted on the forward end of the plunger which is a close working fit within the cylinder, a re-entrant groove in the rear end of the piston, a resilient sealing means which is in abutment with the said flange and which has a re-entrant groove which is oppositely disposed relatively to the re-entrant groove in the rear end of the piston and a space between the rear end of the piston and the resilient sealing means which is open to both the re-entrant grooves and to the cylinder and into which any fluid leaking past the piston can accumulate and effect a compression of the air which becomes trapped in the re-entrant groove at the rear of the acting face of the piston and which entails a reaction in the re-entrant groove of the resilient sealing means which effects a leak proof seal with a pressure which is less than that built up on the acting face of the piston.

6. Sealing means for pistons comprising a substantially vertically arranged cylinder, a plunger for reciprocation within said cylinder, an enlarged space located at the lower end of the cylinder, a stationary resilient sealing means which surrounds the plunger and which has a re-entrant groove and which is located in the bottom of the said enlarged space and a stationary re-entrant groove which is oppositely disposed relatively to the re-entrant groove of the resilient means so that any fluid leaking past the plunger can accumulate in the said space and effect a compression of air within the space which is caused to react on the resilient sealing means to effect a leak proof seal with a pressure which is less than that built up on the acting face of the piston.

JAMES HENRY PRATT.